United States Patent [19]

Pousette et al.

[11] 4,431,367
[45] Feb. 14, 1984

[54] LOG-SEPARATING LATERAL TRANSFER APPARATUS

[75] Inventors: Ronald D. Pousette, Vancouver; John L. Sanders, North Vancouver, both of Canada

[73] Assignee: Brunette Machine Works, Ltd., New Westminster, Canada

[21] Appl. No.: 399,243

[22] Filed: Jul. 19, 1982

[51] Int. Cl.³ .......................................... B65G 37/00
[52] U.S. Cl. .................................. 414/748; 198/492; 221/238
[58] Field of Search ...................... 414/129, 745, 748; 198/443, 489, 492; 221/238, 274

[56] References Cited

U.S. PATENT DOCUMENTS

| | | | |
|---|---|---|---|
| 2,609,942 | 9/1952 | Kofoid | 414/433 |
| 2,820,573 | 1/1958 | McConnell | 414/748 X |
| 2,993,606 | 7/1961 | Helstrom | 198/443 X |
| 3,184,034 | 5/1965 | Stuller et al. | 198/443 |
| 3,235,101 | 2/1966 | Milhaupt | 414/134 |
| 3,306,472 | 2/1967 | Blanz | 414/748 |
| 3,330,401 | 7/1967 | Ahlstedt | 198/492 |
| 3,502,191 | 3/1970 | Valo | 198/489 |
| 3,584,726 | 6/1971 | Hartzell | 198/492 |
| 3,700,116 | 10/1972 | Rysti | 414/748 |
| 3,999,684 | 12/1976 | Ekholm | 221/301 |
| 4,245,735 | 1/1981 | Valo | 198/492 |

OTHER PUBLICATIONS

Advertising Brochure of Valon Kone (undated).
Advertisement from Aug. 1982, publication of Hiballer, p. 103.

*Primary Examiner*—Robert J. Spar
*Assistant Examiner*—Ken Muncy
*Attorney, Agent, or Firm*—Kolisch, Hartwell & Dickinson

[57] ABSTRACT

A lateral log transfer apparatus which functions to separate logs for travel end-to-end, and one at a time, away from the apparatus. Included in this apparatus are at least two longitudinally displaced pairs of counter-rotative discs which are formed with angular peripheral regions characterized by plural angularly related chord stretches which function, because of their relative angular orientations and relative sizes, to promote positive separations of laterally adjacent logs prior to log transfer to an off-bearing conveyor.

11 Claims, 13 Drawing Figures

LOG-SEPARATING LATERAL TRANSFER APPARATUS

BACKGROUND AND SUMMARY OF THE INVENTION

This invention pertains to log-handling apparatus, and more particularly to a device which functions to separate laterally fed logs for transmission end-to-end, and one at a time, to an off-bearing conveyor. While there may be many applications where such a separating device is useful, the device disclosed herein will be described in the setting of a sawmill, at a location just upstream from a log debarker.

In the usual sawmill, logs which are brought in for cutting into lumber, are transferred from a log pond to a conveyor which is intended to transport them, one at a time, into processing machinery such as a conventional log debarker. Typically, logs which are furnished this conveyor arrive side-by-side, and must be separated in some suitable fashion so that only one log at a time arrives at such machinery.

In the past, several kinds of lateral log separating devices have been made available, which are intended to accomplish the goal of one-by-one log feeding. For example, two such devices are disclosed in U.S. Pat. Nos. 3,502,191 and 4,245,735, both issued to Antti Valo.

A general object of the present invention is to provide an improved and unique lateral-transfer log-separating apparatus which offers reliable separation of laterally adjacent logs whose diameters fall within a predetermined range of diameters, and which, therefore, takes care of the problems heretofore experienced with conventional separating apparatus.

Another object of the invention is to provide such apparatus which is relatively simple and maintenance free in construction.

Still another object of the invention is to provide apparatus of the type just generally outlined, which can be installed in existing sawmills as a ready replacement for related prior-art apparatus, without the requirement for any major mill modification.

According to a preferred embodiment of the invention, the proposed apparatus includes, on a pair of side-by-side displaced, substantially parallel shafts, at least two longitudinally displaced pairs of adjacent discs, which, together with their mounting shafts, are driven to perform reversible cyclical counter-rotation, in plural ongoing operating cycles which result in the one-by-one delivery, to an off-bearing conveyor, of successive logs. The discs in each pair are each formed with a uniquely configured perimeter portion characterized by multiple angularly oriented chord stretches which function, as will be described below, to perform positive log separation.

While different mills may be set up to handle different ranges of log diameters, the apparatus of the invention, as described herein, has been designed to handle logs whose diameters fall within the range from about $3\frac{1}{2}$-inches to about 21-inches. Also, while different mills might be intended for the handling of logs having different maximum lengths, the apparatus herein discussed is designed to handle logs having lengths up to about 20-feet.

With respect to the capability of the instant apparatus to perform positive log separation, probably the most critical condition is that encountered where two successive side-by-side logs each has substantially the smallest diameter ($3\frac{1}{2}$-inches herein) expected to be encountered. The chord stretches referred to above which form a critical element in the apparatus of the invention are uniquely shaped and oriented, as will be explained, to assure positive separation under the critical operating condition just described.

Simplicity in the construction of the apparatus of the invention is contributed largely by the fact that all of the operative log-separating discs just mentioned are carried for counter-rotation on only two torque-tube shafts, which are driven through the action of a common air-actuated cylinder. These two shafts are supported on a simple common frame, and are journaled for counter-rotation merely by two sets of end bearings. One of the advantages of using torque-tube shafts, as just indicated, is that they can be made robust, and yet light in weight so as not to be subjected to bending. Further, a two-shaft construction as outlined, obviates the necessity for bearings intermediate the end bearings, and offers a structure which is minimally subject to catching debris.

These and other objects and advantages which are attained by the invention will become more fully apparent as the description which now follows is read in conjunction with the accompanying drawings.

DETAILED DESCRIPTION OF THE INVENTION

Figure 1:
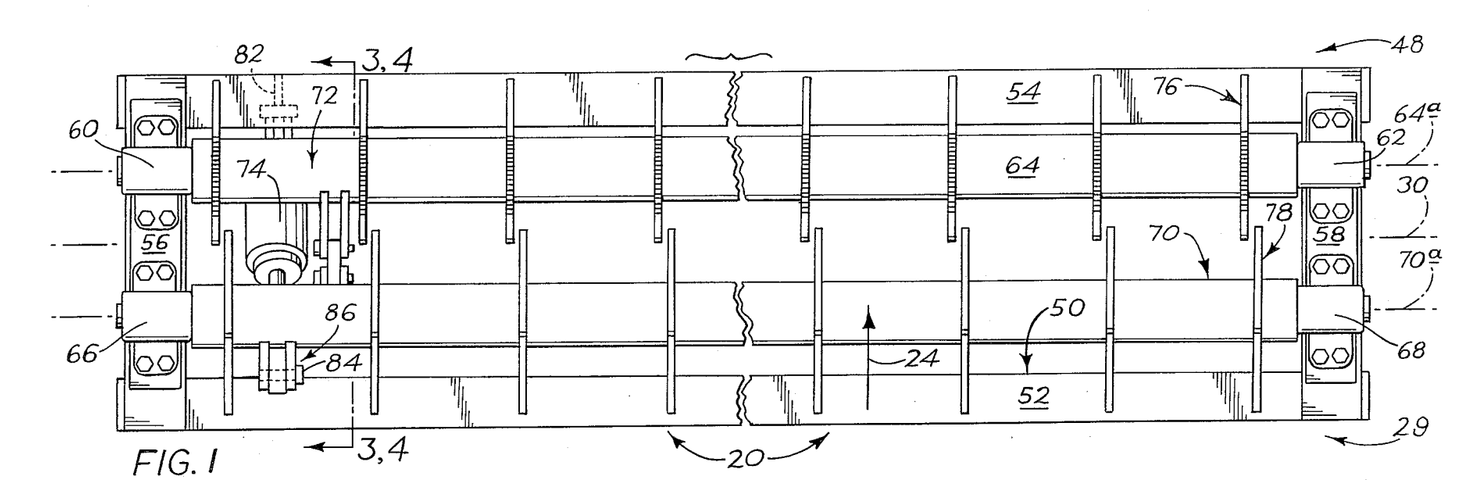
FIG. 1 is a fragmentary top plan view of a log-separating lateral-transfer apparatus constructed in accordance with the present invention.
Figure 2:
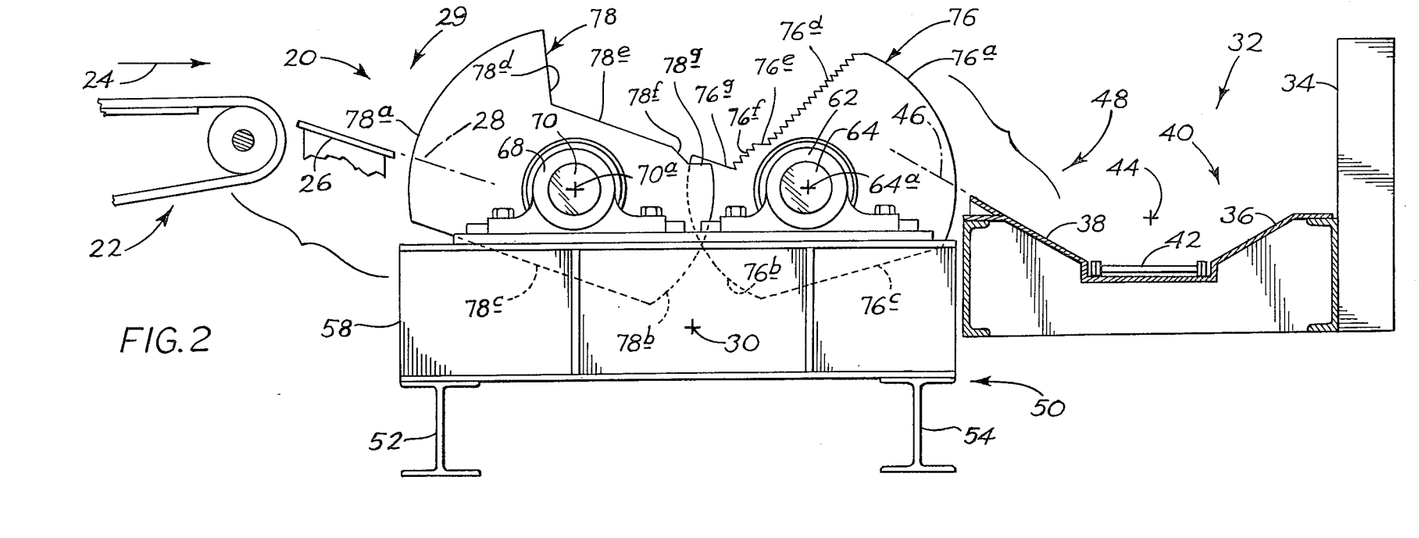
FIG. 2 is a view, on a larger scale than FIG. 1, taken as if from the right end of FIG. 1, and rotated 90° clockwise to show the positional setting of the apparatus of FIG. 1 relative to infeed and off-bearing conveyor mechanisms in a sawmill—all of that which is shown in FIG. 2 being immediately upstream from a conventional log debarker.

Turning now to the drawings, and referring first of all to FIGS. 1 and 2, indicated generally at 20 is a log-separating lateral-transfer apparatus which is constructed in accordance with the present invention. In general terms, apparatus 20 forms part of what might be thought of as the infeed transport apparatus for logs which are being transferred from the usual log pond (not shown) to a conventional rotating-ring log debarker (also not shown). In the setting now being described, logs, in any suitable fashion, are transferred from the log pond mentioned to side-by-side laterally adjacent positions on a lateral-transfer chain conveyor, such as the one shown fragmentarily at 22 in FIG. 2. On this conveyor, such logs travel toward apparatus 20, generally in the direction of arrow 24. Typically, the lateral travel speed for logs on conveyor 22 is about 25-feet-per minute. Logs which are handled by apparatus 20 herein have diameters which range from a minimum of about 3½-inches to a maximum of about 21-inches. Also, such logs have a typical and maximum length of about 20-feet.

Logs on the chains in conveyor 22 are delivered by gravity from the right end thereof in FIG. 2 onto a downwardly slanted sheet-like apron 26 whose upwardly facing support surface lies generally within the plane indicated by dash-dot line 28 in FIG. 2. Plane 28 is normal to the plane of FIG. 2. This support surface defines what is referred to herein as an intake station 29 relative to apparatus 20, and it is from this intake station that successive logs are collected, as will be described, by apparatus 20.

As will be apparent, the long axes of logs received in station 29 are substantially normal to the plane of FIG. 2, and substantially parallel to the longitudinal axis of apparatus 20, which axis is shown generally at 30.

Shown to the right of apparatus 20 in FIG. 2 is an off-bearing conveyor mechanism 32 having a frame 34 which carries convergently slanted aprons 36, 38 that define a trough 40 in the base of which travels a chain conveyor 42. The upper run of conveyor 42 (the run visible in FIG. 2) travels normal to the plane of, and away from the viewer in, FIG. 2 along a transport axis shown generally at 44, which axis is substantially parallel to previously mentioned axis 30.

The upper surface of apron 38 occupies a plane 46 which slopes downwardly progressing away from apparatus 20, and which is substantially normal to the plane of FIG. 2. The upper surface of this apron defines what is referred to herein as a discharge station 48 relative to apparatus 20. Logs which are received by conveyor mechanism 32 are transported by chain conveyor 42 endo, and at a travel speed of about 200-feet-per-minute. These logs are fed directly to the intake side of the log debarker mentioned earlier.

Considering now with somewhat greater detail the construction of apparatus 20, and still referring particularly to FIGS. 1 and 2, the apparatus includes a frame 50 which is formed, among other things, by a pair of longitudinal I-beams 52, 54, to the tops of opposite ends of which are joined, as by welding, a pair of transverse I-beams 56, 58. The long axis of this frame, which is also the long axis of apparatus 20 has already been identified above at 30.

Mounted on the tops of beams 56, 58, through conventional roller bearings 60, 62, respectively, are reduced-diameter opposite end portions of an elongated, generally cylindrical shaft 64. Similarly, mounted on these same two I-beams, through like roller bearings 66, 68, are the reduced-diameter opposite end portions of a similar elongated cylindrical shaft 70. Shafts 64, 70 are thus journaled for rotation about their longitudinal axes which are shown at 64a, 70a, respectively.

Shafts 64, 70 are operatively interconnected, and are driven cyclically, in coordinated reversible counter-rotative movements, by a drive mechanism generally indicated at 72 in FIG. 1, which mechanism includes a conventional double-acting pneumatic ram 74. Operation of mechanism 72 will be explained shortly.

Continuing with a description of apparatus 20 as seen in FIGS. 1 and 2, mounted, as will be explained, on the outsides of shafts 64, 70, at plural longitudinally equidistance stations along the shafts, are pairs of cooperatively associated discs, including, in each pair, a disc, such as disc 76, anchored as by welding to shaft 64, and a slightly longitudinally displaced disc 78 anchored to shaft 70.

Each of discs 76 is mounted on shaft 64 with a like angular orientation relative to the axis of the shaft. This condition will be obvious from FIG. 2 which depicts the nearest one of discs 76 hiding all of the other similar discs.

Focusing attention now on a disc 78 as depicted in FIG. 2, the same has a perimetral outline which includes a pair of generally diametrically opposed curved stretches 78a, 78b, having radii, respectively, of about 1½-feet and 1-foot 2½-inches, and subtending angles, respectively, of about 90° and 70°. Extending between the lower extremities of stretches 78a, 78b in FIG. 2 is a straight chord stretch 78c which subtends an angle of about 110°. Extending between the upper extremities of curved stretches 78a, 78b in FIG. 2 is a perimeter portion including plural chord stretches 78d, 78e, 78f, 78g. These four stretches are referred to herein, respectively, as first, second, third and fourth chord stretches. Stretches 78d, 78e and 78f, 78g join one another through radially outwardly facing obtuse angles of about 115° and 140°, respectively, and stretches 78e, 78f join one another through an outwardly facing reflex angle of about 200°. Stretches 78d, 78e, 78f, 78g have lengths, respectively, of about 8-inches, 1-foot 1-inches, 3-inches and 2½-inches.

As was true with respect to the angular relationship of discs 76 and the axis of shaft 64, discs 78 all have substantially the same angular relationship relative to the axis of shaft 70.

As will be more fully explained, discs 76, 78 in FIGS. 1 and 2 are shown in one limit counter-rotated condition, which will be referred to herein as a closed condition for the discs. In this condition, the adjacent perimeter portions of discs 76, 78 in each associated pair of discs overlap one another, as viewed along apparatus axis 30. And, as will be apparent, the outer radial extent to chord stretch 76g lies along a circular path which substantially intersects the region of joinder of chord stretches 78f, 78g.

Figure 3:
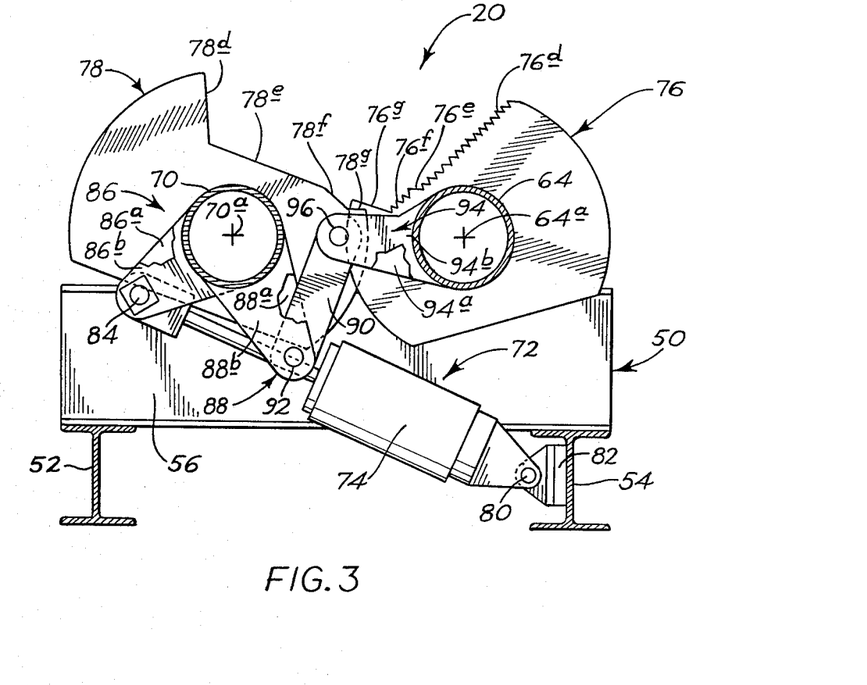
FIGS. 3 and 4 are on about the same scale as FIG. 2, are taken generally along the common view line 3—3, 4—4 in FIG. 1, and illustrate the two opposite-extreme counter-rotated relative positions for log-separating discs which form part of the apparatus of the invention—FIG. 3 showing a pair of associated discs in fully closed conditions, and FIG. 4 showing the same discs in fully opened conditions.
Figure 4:
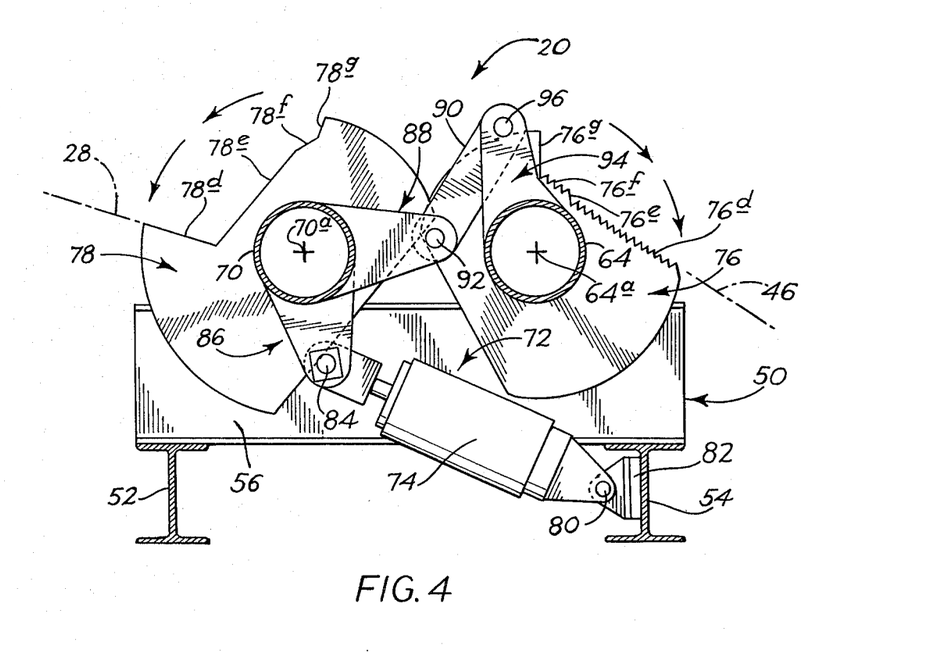

Addressing attention now to FIGS. 3 and 4 along with FIGS. 1 and 2, FIG. 3 is similar to the central portion of FIG. 2 with respect to the relative positions shown for discs 76, 78 therein. Still to be detailed in order to complete a description of apparatus 20 is the structure of drive mechanism 72, and this mechanism is best explained with reference to FIGS. 3 and 4 taken along with FIG. 1. In particular, the butt end of the cylinder in ram 74 is pivoted at 80 to a bracket 82 which is joined, as by welding, to the inside face of the central flange in beam 54, near the left end of the beam as seen in FIG. 1. The rod end of the ram is pivoted at 84 to a double-arm crank 86 including arms 86a, 86b, which arms are welded to the outside of shaft 70 at the locations shown. Also welded to the outside of shaft 70, in close proximity to crank 86, is another crank 88 which includes spaced arms 88a, 88b. The relative angular orientation of cranks 86, 88 is clearly evident in FIGS. 3 and 4.

Connecting crank 88 and shaft 64 are a link 90, pivoted near one of its ends at 92 to the outer ends of arms 88a, 88b, and another double-arm crank 94 having spaced arms 94a, 94b, the outer ends of which are pivoted at 96 to the other end of link 90.

In FIG. 3, ram 72 is shown in a fully extended condition, with discs 76, 78 in their closed conditions. With contraction of the ram, the cranks and link coact to adjust themselves toward the positions shown therefor in FIG. 4, with resulting coordinated, simultaneous, opposite-direction rotation of discs 76, 78 in clockwise and counter-clockwise directions, respectively, as indicated by the curved arrows in FIG. 4. The relative angular orientation of the discs in FIG. 4 represents the opened condition for the discs. It should be noted that with the discs in the opened condition, chord stretches 76d in discs 76 are substantially coplanar with previously mentioned plane 46, and chord stretches 78d in discs 78 are substantially coplanar with previously mentioned plane 28. In the normal operation of apparatus 20, ram 74 is cycled repetitively between extended and contracted conditions, with resultant reverse, oscillatory motion produced in the discs to shift them between the conditions depicted in FIGS. 3 and 4. With the two conveyor transport speeds mentioned herein earlier, a typical cyclic rate for extension and contraction of ram 74 is about 15-cycles-per-minute.

Speaking in general terms about the operation of apparatus 20, it should at this point be intuitively obvious that, as the discs in apparatus 20 are shifted recurrently between their opened and closed conditions, successive logs, and occasionally successive groups of logs, are collected from intake station 29 for ultimate delivery to discharge station 48. As has been stressed herein earlier, it is intended that, in the process of log transfer between station 29 and station 48, the logs be separated positively so that no more than one log at a time is delivered to the discharge station, and fed onto the conveyor in mechanism 32.

Figure 5:
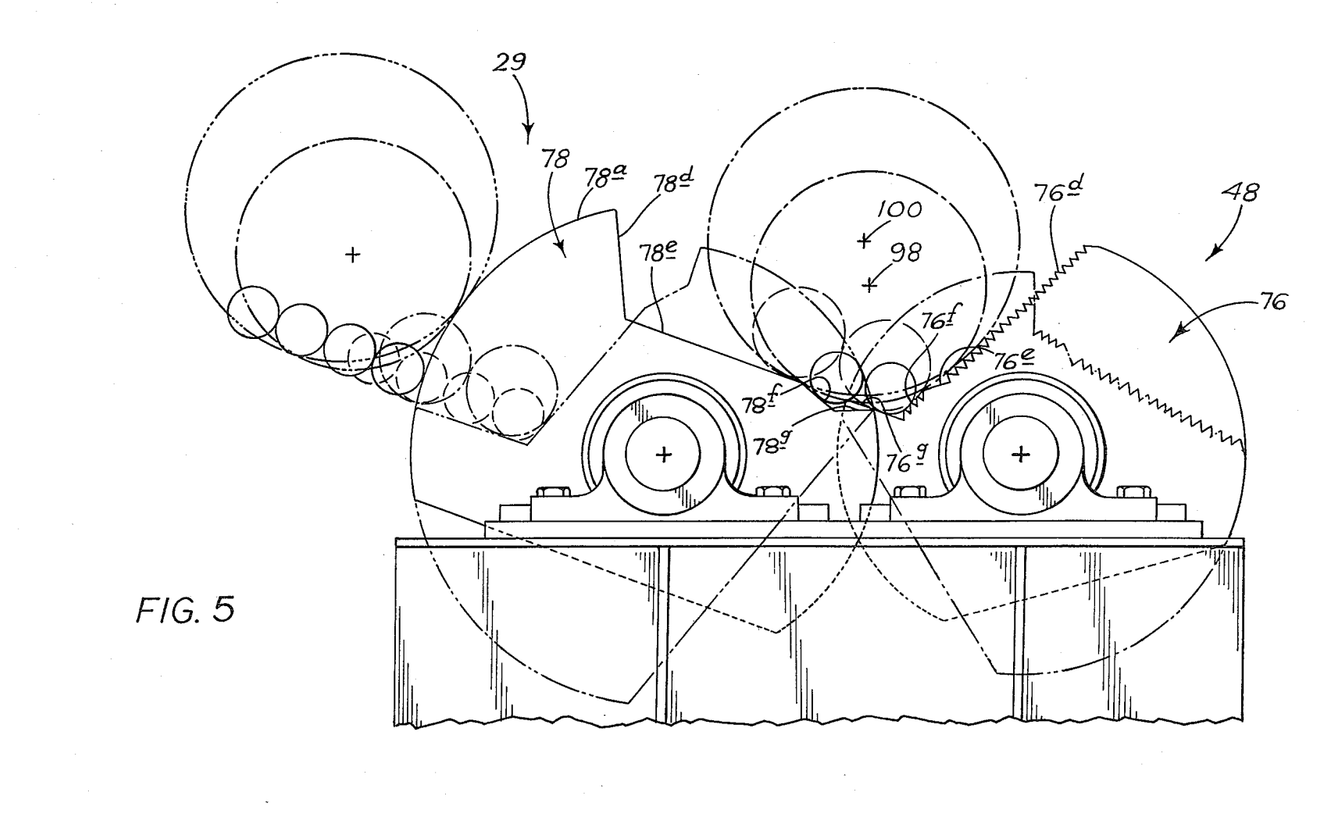
FIG. 5 is similar to FIG. 3, but is on a larger scale, and depicts several different log-separating and transfer operating conditions, including what might be thought of as the extreme or critical operating conditions.

A study of FIG. 5, along with the discussion now to be presented, will help to explain several important operating conditions for apparatus 20 during actual log-handling situations. In this figure, discs 76, 78 are shown in solid outline in which has been referred to as their closed condition. In phantom lines in this same figure, the same discs are shown in their so-called opened condition. In the central portion of this figure, there appear several circles depicted with different line qualities which have been placed there to represent several interesting handling conditions for logs having four different specific diameters encompassed by the total range of log diameters intended to be handled by apparatus 20. Similarly, appearing toward the left side of the figure, and again with different line qualities, there appear multiple circles which illustrate different log-collection situations confronted by the apparatus in the region of intake station 29.

Let us first examine the activity which occurs in the central region of the apparatus, which activity is critical to proper functioning of the apparatus in its role as a log separator. Probably the most difficult handling condition is that which occurs when two or more logs of extremely small diameter have been collected by discs 78. In FIG. 5 the two smallest-diameter circles, which are shown in solid lines, represent idealized logs having the minimum acceptable diameter of 3½-inches. In this situation, it is important that, with counter-rotation of the discs toward their opened condition, only one of these two logs be plucked from the central region for delivery to the discharge station. Obviously, in the condition illustrated in FIG. 5, this refers to the right-hand one of the two small-diameter logs indicated. It should be apparent that an important factor here to be considered is the construction of the perimeter portions of discs 76. More specifically, the structures of chord stretches 76f, 76g here play a critical role. And, it will be seen that the relatively sizing and angulation of these two chord stretches are such that, with clockwise rotation of discs 76 from the position depicted in FIG. 5, only the right-hand one of the two small-diameter logs will in fact be removed from the center of the apparatus and delivered to the discharge station. The other small-diameter log will roll ultimately to the left along chord stretches 78e, and bottom out in the region where these chord stretches join with chord stretches 78d, as discs 78 rotate in a counterclockwise direction toward the opened condition.

Repeated practice handling under the operating condition just described has established a reliable history of log separation under the most demanding of all separating conditions. Such separation is accomplished predictably regardless, in almost all instances, of the shape of the log, be it bowed, flared, twisted or deformed with projecting bumps and branches.

Shown in dashed lines in the central portion of FIG. 5 are two circles which represent the presence therein of two 6-inch diameter logs. A quick mind's eye study of what will happen with counter-rotation of the discs toward the opened condition will indicate that, here also, positive log separation will occur, with only the right-hand one of these two logs in the figure being discharged to station 48. In dash-dot lines in the center portion of FIG. 5, there is shown an idealized 16-inch diameter log which rests alone in the cradle defined between the discs. The axis of this log is shown at 98, and it can be seen that this axis is, from the point of view of the line of action of gravity, located to the right of the outer radial extension of chord stretch 76g. Because of this situation, with counter-rotation of the discs toward the opened condition, this 16-inch log will be transferred to discharge station 48.

In dash-double-dot lines in the center of FIG. 5 there is shown an idealized 21-inch diameter log—the largest diameter log intended to be handled. The longitudinal axis of this log is shown at 100, and, while positioned slightly to the left of axis 98 as viewed in FIG. 5, is nevertheless gravitationally to the right of the outer extremity of chord stretch 76g. Thus, counter-rotation of the discs will, here too, assure positive proper transfer of this log to the discharge station.

Turning attention now to the several situations, vis-a-vis log collection, illustrated adjacent the left side of FIG. 5, the four small-diameter circles which are shown in solid lines represent four idealized 3½-inch diameter logs resting on apron 26 in station 29 awaiting collection under circumstances with the discs in apparatus 20 in the conditions shown therefor in solid lines in FIG. 5. In this waiting situation, the right-hand-most log is in contact with the surfaces of curved stretches 78a in discs 78, and the other three logs abut one another progressing upwardly along the apron, as shown.

With counter-rotation of the discs to the opened condition (see the phantom lines in FIG. 5) these four logs roll by gravity downwardly to positions where the two right-hand-most logs are fully supported on chord stretches 78d, the next uphill log straddles the gap between discs 78 and apron 26, and the fourth uphill log is fully supported still on apron 26. This condition is illustrated in FIG. 5 with the small-diameter logs depicted in dashed lines.

Then, with return counter-rotative movement of the discs toward their closed condition, only the right-hand two logs will be collected by discs 78—the other two logs being shifted slightly upwardly to remain on the apron in the positions previously held by the two right-hand-most logs in solid outline in FIG. 5. Such a log-collection operation is one which have lead to the separation condition first described in connection with this figure respecting the two small-diameter solid logs shown in the center of the figure. It should be obvious to those now reading this description that there are certainly other kinds of collection conditions when plural logs can be collected at once, but there will substantially never be a condition when more than two logs—those being of the smallest expected diameter—will be collected. And, inasmuch as the challenge presented apparatus 20 to separate two such small-diameter logs, simultaneously held in the trough defined between the discs when closed, is the most taxing situation, all other separations where more than one log has been collected will take place readily.

Still with reference to the left side of FIG. 5, shown in dash-dot lines are two larger-diameter circles which represent two idealized 6-inch diameter logs in the relative positions which they will occupy, if adjacent one another, under a circumstance with the apparatus open, and in a condition ready to collect a log. In this situation, only the right-hand one of these two logs will be collected—the left-hand log being shifted upwardly slightly along the apron with clockwise rotation of discs 78.

In dash-double-dot lines and in dash-triple-dot lines in FIG. 5, there are shown idealized logs having diameters of 16-inches and 21-inches, respectively, resting on apron 26 and in contact with curved stretches 78a in discs 78. It should be obvious what happens in the cases of each of two such logs when the discs in apparatus 20 have rotated to their opened condition. Namely, the single log alone awaiting collection is all that will be collected.

Let us shift attention now to FIGS. 6–13 inclusive which, as mentioned earlier, depict two full operating cycles of apparatus 20.

Figures 6, 7, 8:
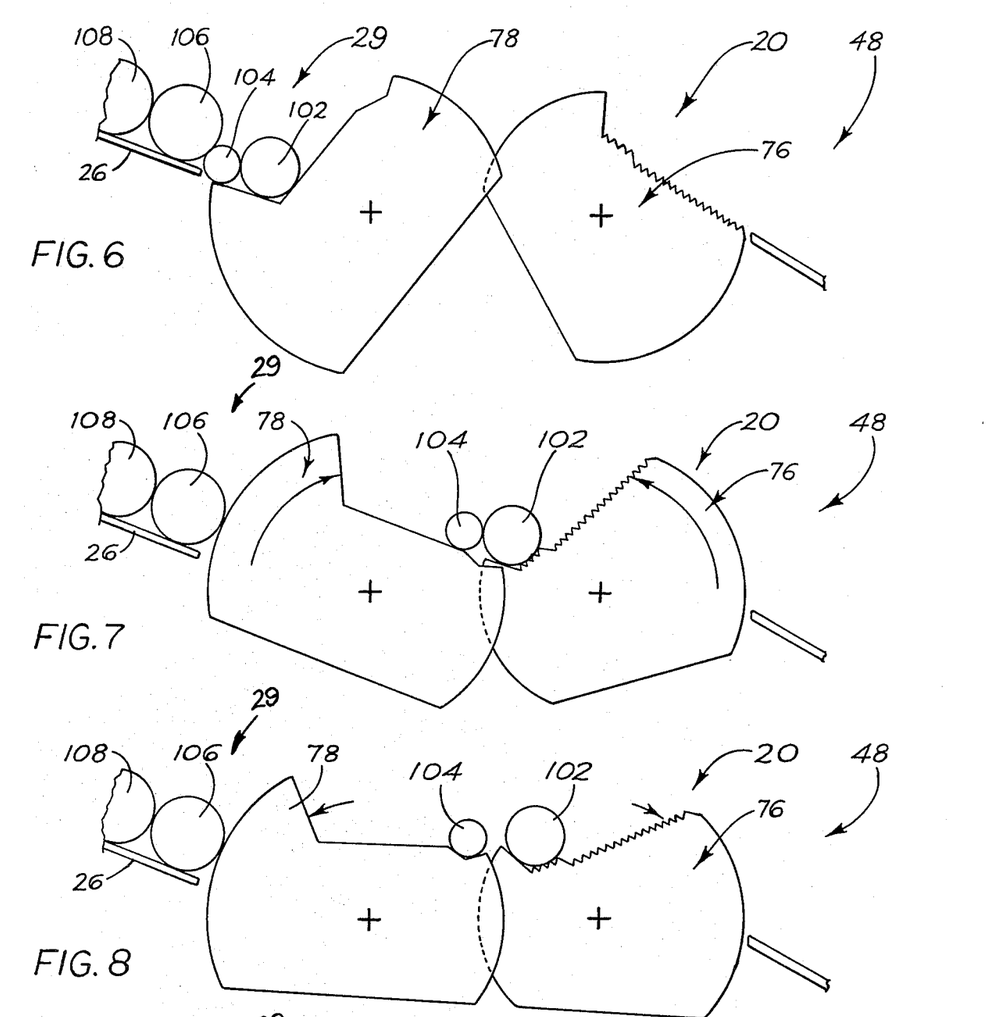
FIGS. 6–13, inclusive, are schematic derawings, on roughly the same scale as FIGS. 2, 3 and 4, illustrating two typical operating cycles for the apparatus of the invention.

Starting with FIG. 6, discs 76, 78 are shown in the opened condition and four logs of different diameters are shown at 102, 104, 106, 108. Logs 102, 104 are of such sizes that both will be collected simultaneously by the apparatus. FIG. 7 depicts the end of the first next half-cycle in the operation of apparatus 20, with the discs shown in their closed conditions, and with both of logs 102, 104 nestled in the trough defined by the discs. Logs 106, 108 remain on apron 26, in the positions shown.

FIG. 8 shows the condition of apparatus 20 part way into the next half-cycle of operation, and illustrates that separation has occured between logs 102, 104.

Figure 9:
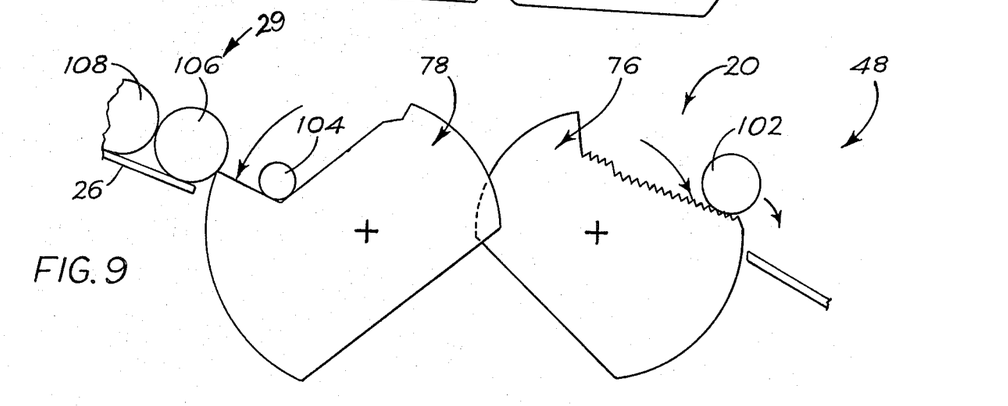

In FIG. 9, the discs are shown in the relative positions which they have nearing the end of the first complete cycle of operation, and it will be noted that log 102 is discharging under the influence of gravity from the apparatus into discharge station 48.

Figure 10:
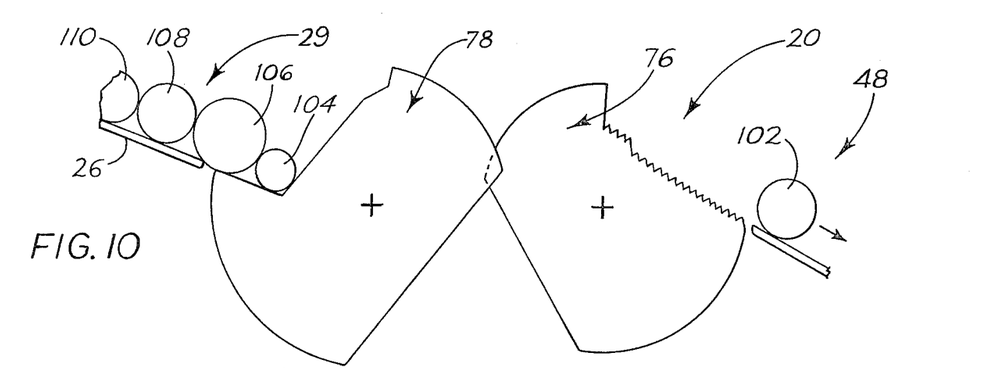

In FIG. 10, the apparatus has returned to the same condition illustrated for it in FIG. 6, except, of course, that the "log situation" has changed. More particularly, log 102 has been transferred from the apparatus, log 106 has been rolled into a position to be collected by the apparatus, log 108 has moved downwardly on apron 26, and next-in-line log 110 has made its appearance on the apron.

In FIG. 11, we again see the discs in the apparatus in their closed condition. Here, logs 106, 104 are nestled in the trough formed between the discs, and logs 108, 110 have remained on apron 26.

Figures 11, 12:
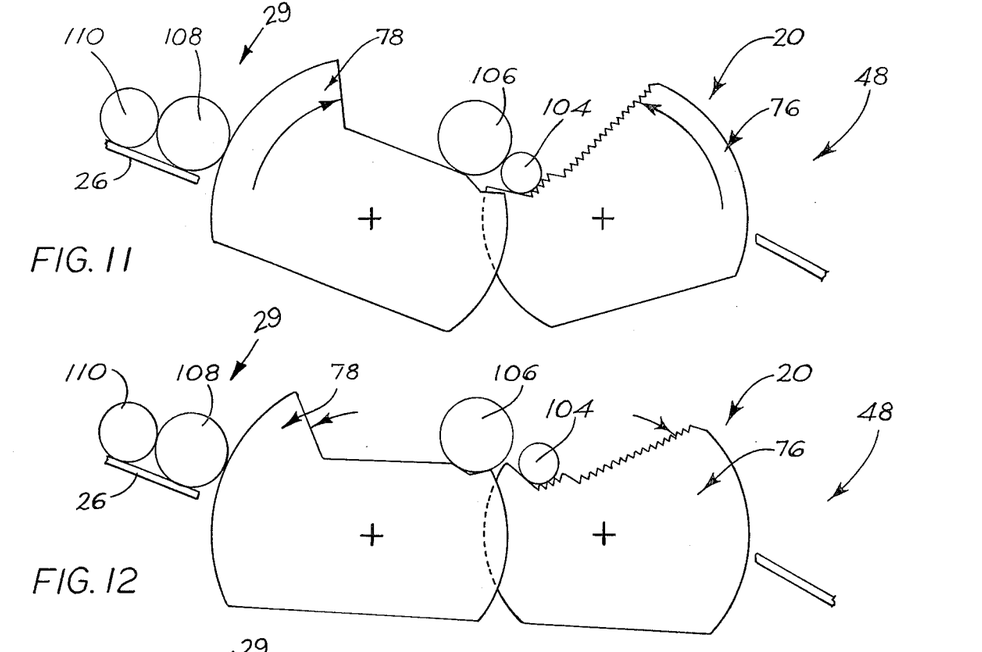

FIG. 12, the relative positions of the discs is the same as that shown in FIG. 8. Here, positive separation has taken place between logs 104, 106.

Figure 13:
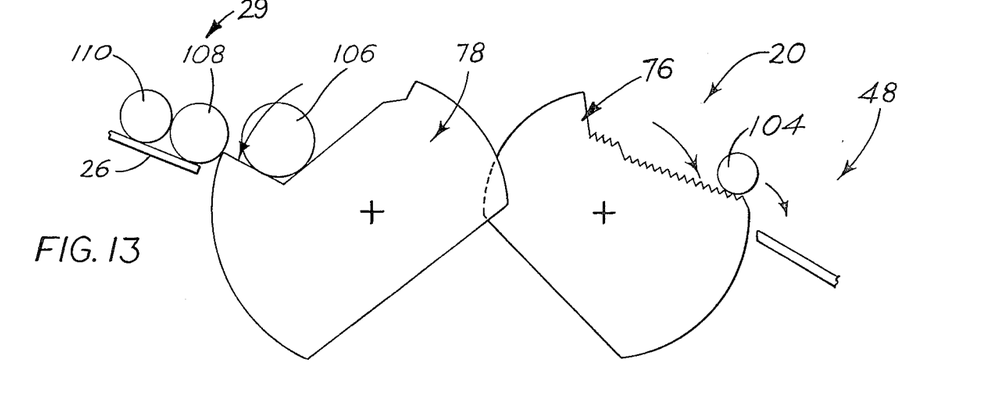

FIG. 13, regarding the relative positions of discs, is like FIG. 9, and here it will be seen that log 104 is dropping by gravity into discharge station 48.

The operation continues in this manner.

It should thus be apparent now all of the advantages and objectives ascribed to the apparatus of the invention are met in the construction which has just been shown and described. Within the entire range of logs for which the apparatus has been designed to operate, positive log separation for feeding of logs one-by-one to an off-bearing conveyor for endo transport is accomplished under all operating conditions.

The proposed apparatus is extremely simple in construction and highly maintenance free. Contributing in an important manner to this aspect of the apparatus is the fact that all of discs 76 are carried on a common shaft 64, and all of discs 78 are carried on a like common shaft 70. A single drive apparatus, coupled through suitable cranks and a link, suffices to operate simultaneously both of these shafts and their associated log-separating discs.

The teeth provided along chord stretches 76d, 76f help to brake the travel of a heavy log falling into the apparatus during a "collection" procedure.

A modification in the apparatus of the invention which may be useful in certain applications, is the provision of a curved "skin" in the form of sheet metal, secured as by welding to the outside surfaces 78a in disc 78. Such a skin would be in the form, generally speaking, of a segment of cylinder, and would act as a fender or bumper with respect to logs in intake station 29.

While a preferred embodiment of the invention has been described herein, it is appreciated that other variations and modifications may be made without departing from the spirit of the invention.

It is claimed and desired to secure by Letters Patent:

1. Apparatus for transferring successive logs, and the like, laterally, and one at a time, between an intake station and a discharge station, said apparatus having a long axis, and comprising at least two longitudinally displaced pairs of adjacent, operatively interconnected, reversibly and cyclically counter-rotative discs, with the two discs in each pair having radially overlapping peripheries, and being mounted for rotation about side-by-side displaced, substantially parallel rotation axes, which axes are substantially parallel both to said long axis, and to the axes of successive logs which are to be transferred by the apparatus, one disc in each pair being disposed adjacent said intake station, and the other being disposed adjacent said discharge station, said one disc in each pair having a perimeter portion defined by plural chord stretches including first, second, third and fourth stretches extending, respectively, in all rotated positions for the disc, generally from adjacent said intake station toward said other disc in the pair, said first and second stretches and said third and fourth stretches, respectively, joining one anothr at outwardly facing obtuse angles, and said second and third stretches joining one another at an outwardly facing reflex angle.

2. The apparatus of claim 1, wherein, said second stretch is greater in length than said first stretch, and said third and fourth stretches are each shorter in length than said first stretch.

3. The apparatus of claim 1, wherein, said other disc in each pair has a perimeter portion defined by plural chord stretches including first, second, third and fourth stretches extending, respectively, in all rotated positions for the disc, generally from adjacent said discharge station toward said one disc in the pair, said first and second stretches and said third and fourth stretches, respectively, in said other disc, joining one another at outwardly facing obtuse angles, and said second and third stretches in said other disc joining one another at an outwardly facing reflex angle.

4. The apparatus of claim 3 wherein, in said other disc, said second, third and fourth stretches each has a length which is less than that of said first stretch.

5. The apparatus of claim 3, wherein, in said one disc, said second stretch is greater in length than said first stretch, and said third and fourth stretches are each shorter in length than said first stretch.

6. The apparatus of claim 5, wherein, in said other disc, said second, third and fourth stretches each has a length which is less than that of said first stretch.

7. The apparatus of claim 3, wherein, considering counter-rotation of said discs, the outer extent of said fourth stretch in said other disc in each pair travels in an arc which substantially intersects the arc of travel of the region of joinder of said third and fourth stretches in said one disc in each pair.

8. The apparatus of claim 4, wherein, said second, third and fourth stretches in said other disc in each pair have a combined length which is less than that of said first stretch in said other disc.

9. Apparatus for transferring successive logs, and the like, laterally, and one at a time, between an intake station and a discharge station, said apparatus having a long axis, and comprising at least two longitudinally displaced pairs of adjacent, operatively interconnected, reversibly and cyclically counter-rotative discs, with the two discs in each pair having radially overlapping peripheries, and being mounted for rotation about side-by-side displaced substantially parallel rotation axes, which axes are substantially parallel both to said long axis, and to the axes of successive logs which are to be transferred by the apparatus, one disc in each pair being disposed adjacent said intake station, and other being disposed adjacent said discharge station, said one disc in each pair having a perimeter portion defined by plural chord stretches, including first, second, third and fourth stretches extending, respectively, in all rotated positions for the disc, generally from adjacent said intake station toward said other disc in the pair, said first and second stretches, and said third and fourth stretches, respectively, joining one another at outwardly facing obtuse angles, and said second and third stretches joining one another at an outwardly facing reflex angle, said other disc in each pair having a perimeter portion defined by plural chord stretches including first, second, third and fourth stretches extending, respectively, in all rotated positions for the disc, generally from adjacent said discharge station toward said one disc in the pair, said first and second stretches and said third and fourth stretches, respectively, joining one another at outwardly facing obtuse angles, and said second and third stretches joining one another at an outwardly facing reflex angle.

10. The apparatus of claim 9, wherein, in said other disc, said second, third and fourth stretches, each has a length which is less than that of said first stretch.

11. The apparatus of claim 10, wherein, said second, third and fourth stretches in said other disc have a combined length which is less than that of said first stretch in said other disc.

* * * * *